United States Patent [19]
Williams et al.

[11] 3,972,446
[45] Aug. 3, 1976

[54] PRESSURIZED DISPENSERS

[75] Inventors: Jillian A. Williams, Thorpe; Ronald James, Hillingdon, both of England

[73] Assignee: Wilkinson Sword Limited, Great Britain

[22] Filed: Aug. 14, 1974

[21] Appl. No.: 497,305

[30] Foreign Application Priority Data
Aug. 18, 1973 United Kingdom............ 39151/73

[52] U.S. Cl. .............................. 222/3; 260/28 R; 260/28.5 A; 260/28.5 B; 260/29.1 SB; 260/31.2 N; 260/32.8 A; 260/32.8 N; 260/33.2 R; 260/33.4 R; 260/33.4 PQ; 260/33.6 R; 260/33.6 A; 260/33.6 AQ; 260/33.6 PQ; 260/33.8 R; 260/33.8 UA

[51] Int. Cl.² ..................... B67B 7/24; C08K 5/01

[58] Field of Search ............ 222/3, 389, 394, 399, 222/402.1; 260/28, 28.5 A, 28.5 B, 29.1 SB, 31.2 N, 32.8 A, 32.8 N, 33.2 R, 33.4 R, 33.4 PQ, 33.6 R, 33.6 A, 33.6 AQ, 33.6 PQ, 33.8 R, 33.8 UA

[56] References Cited
UNITED STATES PATENTS

| | | | |
|---|---|---|---|
| 2,964,083 | 12/1960 | Pfau et al. ............... | 260/33.6 AQ |
| 3,122,284 | 2/1964 | Miles ....................... | 222/399 |
| 3,332,903 | 7/1967 | Kavalir .................... | 260/32.8 A |
| 3,777,934 | 12/1973 | Meeks et al. ............. | 260/86.3 |
| 3,858,764 | 1/1975 | Watson .................... | 222/399 |

OTHER PUBLICATIONS

Sanders—Principles of Aerosol Technology (van Nostrand) (N.Y.) (1970), p. 73.

Primary Examiner—Donald E. Czaja
Assistant Examiner—H. H. Fletcher
Attorney, Agent, or Firm—Leydig, Voit, Osann, Mayer & Holt, Ltd.

[57] ABSTRACT

The present invention provides pressurized dispensers comprising a container provided with a valve-controlled outlet and containing a concentrate and a reservoir holding propellant. The reservoir comprises a crystalline organic polymer which is capable of holding propellant therein in such a way that the vapor pressure over the held propellant is reduced below that over the pure propellant, the polymer being capable of holding at least 15% of its own weight of propellant at room temperature, and the reservoir being capable of releasing propellant within the container as the contents of the container are dispensed.

28 Claims, 2 Drawing Figures

PRESSURIZED DISPENSERS

This invention relates to pressurized dispensers such as aerosol containers.

According to the present invention, there is provided a pressurized dispenser comprising a container provided with a valve-controlled outlet and containing a concentrate and a reservoir holding propellant, the reservoir comprising a crystalline organic polymer capable of holding propellant therein in such a way that the vapour pressure over the held propellant is reduced below that over the pure propellant, the polymer being capable of holding at least 15% of its own weight of propellant at room temperature, and the reservoir being capable of releasing propellant within the container as the contents of the container are dispensed.

The invention further provides a pressurized dispenser comprising a container provided with a valve-controlled outlet and containing a concentrate and a reservoir holding propellant, the reservoir comprising a crystalline organic polymer which has been cast from an organic solvent, the cast polymer being capable of holding propellant therein in such a way that the vapor pressure over the held propellant is reduced below that over the pure propellant, the polymer being capable of holding at least 15% of its own weight of propellant at room temperature, and the reservoir being capable of releasing propellant within the container as the contents of the container are dispensed.

The term "crystalline" refers herein to polymers having a high degree of ordering of molecular structure. Although these polymers show a high degree of crystallinity compared with elastomeric polymers, they inevitably possess a degree of non-crystallinity. Crystalline polymers which are not capable of holding at least 15% of their own weight of propellant at room temperature are not normally suitable for use as reservoir material, but although a particular crystalline polymer may be unsuitable for use as reservoir material if extruded under pressure, it may nevertheless be rendered suitable if cast from an organic solvent.

It is not yet known how the vapor pressure of the propellant is lowered, but it is believed that it may be due to dissolution of the propellant in the reservoir material. In contrast, the vapor pressure of a propellant is not reduced when the propellant is merely absorbed in a spongy material.

The organic polymers can be homo-polymers or co-polymers. Examples of homo-polymers which can be used include, for example, polyalkylenes, e.g., high density or low density polyethylene, polypropylene, poly-4-methylpent-1-ene or poly-but-1-ene, polyamides, e.g., nylon 12, or poly-esters, e.g. polyethylene terephthalate. Mixtures of such polymers can also be used, for example mixtures of polyethylene and polypropylene. Other examples of organic polymers which can be used include trans-poly-isoprene, polyformaldehyde, and polyethylene oxide.

The above-mentioned homo- and copolymers in general are unable to dissolve as much as 15% by weight of propellant after they have been extruded or otherwise formed by conventional techniques. However, the amount of propellant which they can hold can be increased by first dissolving the polymer in a solvent followed by evaporation of the solvent. Reservoirs of a desired shape can thus be made by casting a solution of the polymer in a solvent in an appropriately shaped mold, followed by evaporation of the solvent. It is generally preferred that the solvent has good solvent properties for the polymer which is used. Examples of solvents which can be used include substituted and unsubstituted aliphatic or aromatic hydrocarbons, for example cyclohexane, iso-octane, carbon tetrachloride, trichloroethylene, decalin, tetralin, benzene, toluene, xylene or chlorotoluene; terpenes, for example camphene; and alcohols, for example benzyl alcohol.

The amount of solvent used can influence the subsequent ability of the organic polymers to hold propellant. It has been found that with polyethylene, for example, a minimum of about twice its weight of xylene is required in order to obtain a reservoir having a high holding capacity for propellant.

Removal of the solvent is preferably effected at an elevated temperature, for example 70°–110°C, in particular about 75°C, advantageously under reduced pressure, for example at about 10 mm/Hg. Polypropylene cast from toluene was found capable of acting as a reservoir in accordance with the present invention when dried at 105°C, and it was capable of dissolving still further propellant after drying at 75°C.

It has been found that reservoirs produced by the above-described method contain small amounts of the solvent used to cast the reservoirs. In general, it has been found that satisfactory reservoirs can be obtained when the residual amount of solvent is about 0.2% by weight based on the dried polymeric material. However, the amount of residual solvent is usually not critical and it may, for example, be in the range of from 0.02 to 2.0% by weight based on the dried reservoir. High boiling point solvents may be difficult to remove and excessive amounts of solvent may have an adverse effect on the ability of a polymer to hold propellant.

The organic polymers can also be used in extended form. Extended polymers can be prepared conveniently by dissolving the polymer and an extender in a suitable solvent, followed by casting of the resulting solution. Thereafter the cast solution can be dried and a reservoir thereby obtained.

The use of an extender with a crystalline organic polymer which has been cast from solution can enable reservoirs for pressurised dispensers to be produced less expensively than reservoirs containing no extender, since the extenders are usually less expensive than the organic polymers of the reservoirs. Furthermore, such extended organic polymers can in some cases dissolve as much, or even more, propellant than an equal weight of unextended organic polymer. The use of extenders can enable useful reservoirs to be produced from polymers which alone hold less than, and often considerably less than, 15% of their own weight of propellant at room temperature.

The organic polymers can be extended with one or more organic compounds such as an oil or wax, and they may be of natural or synthetic origin.

Organic compounds which can be used as extenders include, for example, hydrocarbons, esters, ethers, or alcohols. The hydrocarbons can be solid or liquid and a preferred class of liquid hydrocarbons is the saturated aliphatic hydrocarbons containing at least 20 carbon atoms, preferably up to 25 carbon atoms. Saturated aliphatic hydrocarbons for use as extenders preferably have boiling points of from 315° to 410°C at normal atmospheric pressure. As little as 1% by weight of liquid paraffin (a mixture of $C_{20-25}$ aliphatic hydrocarbons containing up to 4% by weight of aromatic hydrocarbons) in low density polyethylene has been found to give a substantial improvement in the propellant-holding power of the polymers.

Other liquid hydrocarbons which can be used as extenders include, for example, isoprenoids, preferably containing at least 20 carbon atoms, e.g., squalene.

Solid hydrocarbons, or hydrocarbon waxes, which can be used as extenders preferably have softening points of from 40° to 100°C. Examples of such hydrocarbons include soft white paraffin and microcrystalline wax. Soft white paraffin typically has a softening point of from 40° to 60°C and microcrystalline wax typically has a somewhat high softening point.

Esters which can be used as extenders may be selected from aliphatic, alicyclic or aromatic esters. In general, the aliphatic or alicyclic esters will be waxes and they include, for example, alkyl esters of long chain fatty acids, fatty acid esters of long chain alcohols, and long chain fatty acid esters of sterols. Examples of esters which can be used as extenders include lower alkyl stearates, e.g., butyl stearate, carnauba wax (softening point 80°–90°C) and lanolin. Aromatic esters which can be used as extenders include, for example, di-lower alkyl esters of phathalic acid, e.g., di-n-butyl phthalate.

Ethers which can be used as extenders include polyphenols and polyphenylene oxides.

Cholesterol is an example of an alcohol which can be used as an extender.

Hydrocarbon oils, and in particular liquid paraffin, have been found to be particularly valuable as extenders for polyalkylenes such as polyethylene. The oil should generally be present in an amount of from about 20% to about 80% by weight of the total reservoir. The amount of oil present in the extended organic polymer should, however, be restricted to that which allows the reservoir to retain adequate mechanical strength. Casting of the polymers in itself usually reduces the strengths of the polymers. Thus the reservoirs preferably contain about 50% by weight of organic polymer and about 50% by weight of oil. The use of about 50% by weight of organic polymer often provides particularly satisfactory reservoirs since reducing the amount of extender tends to reduce the cost savings resulting from the use of the extender while larger amounts tend to reduce the mechanical strength of the extended polymers.

The main criteria in the choice of the materials of the reservoir are that the reservoir shall be compatible with the product to be dispensed and that it will hold propellant so that the vapor pressure of the propellant over the organic polymer is less than that over the pure propellant. The organic substances should hold at least 15% by weight of propellant at room temperature. Preferred propellants include alkanes such as butane and fluorinated alkanes such as dichlorodifluoromethane and mixtures of dichlorodifluoromethane and symmetrical dichlorotetrafluoroethane (40:60 by weight, respectively).

As will be appreciated, the extender should be selected such that it is not leached from the extended organic polymer to any appreciable extent either by the concentrate or by the propellant.

Reservoirs for pressurized dispensers as provided by the present invention can contain other substances such as structural fillers for strengthening the reservoir. The fillers should be materials which are inert to the propellant and to the organic materials which themselves form the reservoir and they are preferably less deformable than the organic polymer of the reservoir. Silica, zinc oxide and carbon black are illustrative examples of fillers which may be used. The inclusion of a filler should not adversely affect the ability of the organic polymer to hold propellant.

For a fuller understanding of the present invention, reference is made to the accompanying drawings which graphically show the density of foam dispensed from various aerosol cans as a function of the percentage contents remaining in the cans.

Figure 1:
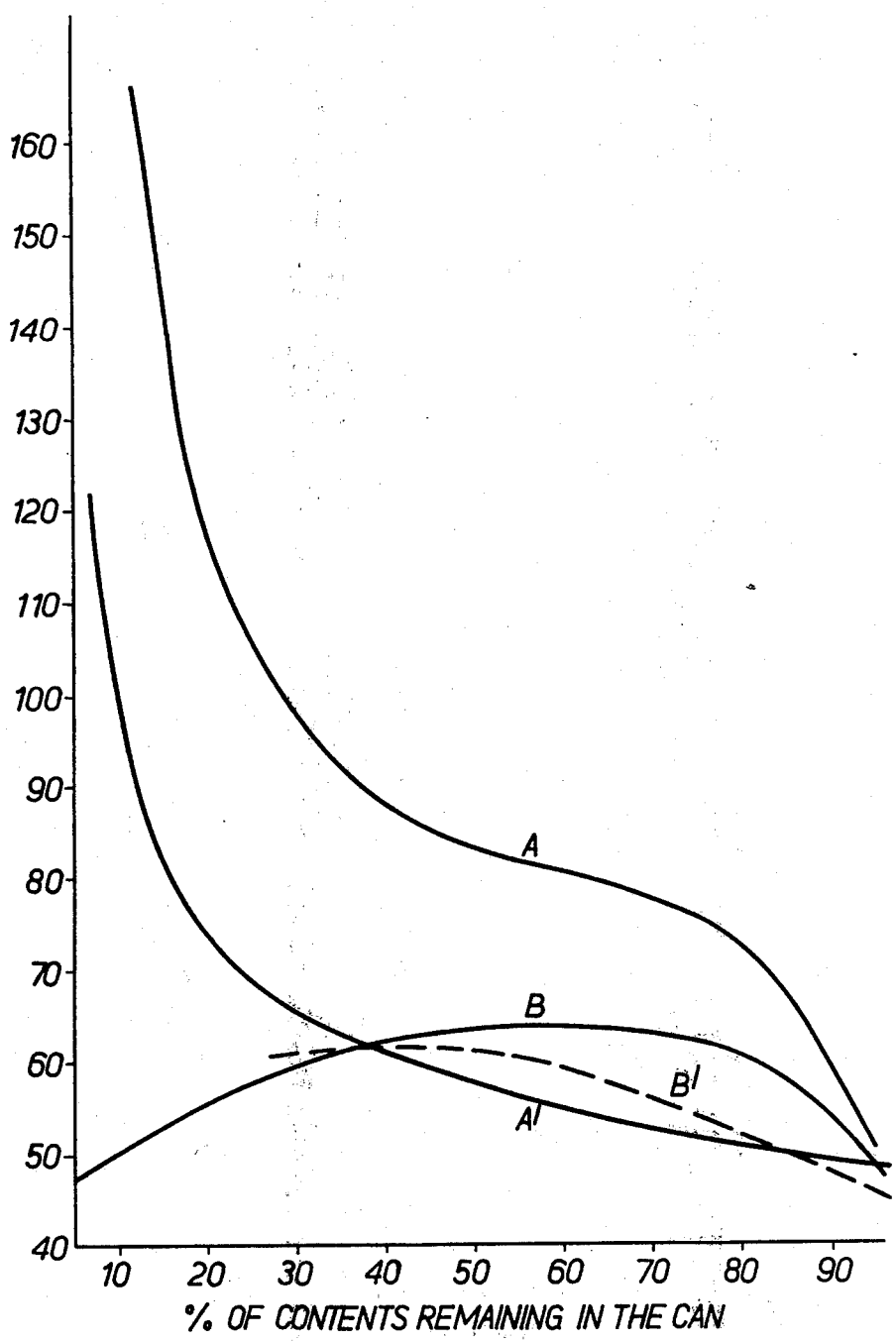
FIG. 1 shows curves A and A' for prior art cans and curves B and B' for cans in accordance with the present invention.

The following Examples are given by way of illustration only.

EXAMPLE 1

Low density polyethylene was extended with liquid paraffin. The polymer was extended by blending it with the liquid paraffin in the presence of toluene, and casting the blend to form sheets by evaporation of the toluene at room temperature.

Samples of the resulting sheet were weighed and placed in a pressure bottle having a manometer for measuring the internal pressure in the bottle. The pressure bottle also contained a vessel holding a known volume of liquid propellant (40:60 by weight of dichlorodifluoromethane and symmetrical dichlorotetrafluoroethane), and the propellant was allowed to equilibrate between the polymer sheets, the head space in the pressure bottle and the liquid phase in the vessel. After equilibration, the volume of liquid propellant remaining in the vessel was measured, as was the head space pressure, and the amount of propellant dissolved by the polymer was calculated.

The percentage by weight of polymer in the sheets was 50 and the weight of propellant held per 100g of extended polymer was 53g.

EXAMPLE 2

Various organic polymers were cast from solutions in various solvents, and the cast polymers were dried either at ambient temperature without forced evaporation of the solvent (A), or at 75°C under a pressure of about 10mm of mercury (B). The weight of propellant held by the resulting polymers was measured and compared with that of the un-cast organic polymer. The results obtained are shown in Table I.

TABLE I

| Polymer | Casting Solvent | Weight of propellant held per 100g of polymer | | | |
|---|---|---|---|---|---|
| | | Freons 12/114 (40:60) | | Butane 40 | |
| | | (A) | (B) | (A) | (B) |
| low density polyethylene | none | 6 | — | 6 | — |
| | xylene | 31,36 | 71 | 48 | 33 |
| | benzene | 115 | 18 | 43 | 23 |
| | toluene | 54,64 | 52 | 37 | 13 |
| | iso-octane | 68 | 57 | 51 | 104 |
| | cyclohexane | 52 | 37 | 42 | 32 |
| | carbon tetrachloride | 43 | 6 | 36 | 6 |
| | camphene | 100 | 0 | 78 | 20 |
| | chlorotoluene | 31 | 30 | 31 | 23 |
| | trichloro- | | | | |

TABLE I-continued

| Polymer | Casting Solvent | Weight of propellant held per 100g of polymer | | | |
|---|---|---|---|---|---|
| | | Freons 12/114 (40:60) | | Butane 40 | |
| | | (A) | (B) | (A) | (B) |
| high density polyethylene | ethylene | 97 | 43 | 32 | 47 |
| | decalin | 37 | 18 | 34 | 20 |
| | tetralin | 72 | 18 | 60 | 17 |
| | none | <8 | — | 3 | — |
| | xylene | 54 | — | 24 | 53 |
| | camphene | 75 | 173 | 42 | 37 |
| | tetralin | 232 | 124 | 68 | 127 |
| polypropylene | none | 5 | — | 21 | — |
| | xylene | 131 | 63 | 137 | 74 |
| | camphene | 329 | 183 | 59 | 18 |
| | tetralin | 166 | 153 | 60 | 60 |
| poly-4-methyl-pent-1-ene | none | 44 | — | 53 | — |
| | xylene | 107 | 22 | 103 | 53 |
| | carbon tetrachloride | 73 | — | 62 | — |
| poly-but-1-ene | none | 0 | — | 5 | — |
| | xylene | 73 | — | 43 | — |
| | carbon tetrachloride | 46 | — | <13 | — |
| nylon 12 | none | 0 | — | 4 | — |
| | benzyl alcohol | — | 60 | — | 45 |
| polyethylene terephthalate | none | 2,10 | — | 6,2 | — |
| | benzyl alcohol | 38 | 46 | 31 | 19 |
| trans-polyisoprene | none | 12 | — | 8 | — |
| | xylene | 35 | — | 21 | — |
| | carbon tetrachloride | 16 | — | 19 | — |
| | benzyl alcohol | 59 | — | — | — |
| polyformaldehyde | none | 5 | — | 5 | — |
| | benzyl | | | | |

TABLE I-continued

| Polymer | Casting Solvent | Weight of propellant held per 100g of polymer | | | |
|---|---|---|---|---|---|
| | | Freons 12/114 (40:60) | | Butane 40 | |
| | | (A) | (B) | (A) | (B) |
| poly-ethyleneoxide | alcohol | 26 | — | 11 | — |
| | decalin | 6 | — | 13 | — |
| | none | 2 | — | 11 | — |
| | xylene | 50 | — | 13 | — |
| | carbon tetrachloride | 33 | — | 3 | — |

As can be seen from Table I, casting the organic polymers generally increases their ability to hold propellant. Drying at ambient temperature generally results in the polymers holding more propellant than if they are dried at elevated temperatures.

EXAMPLE 3

Various polymers were extended with a variety of extenders, by casting from different solvents. Table II shows the weight of propellant held by extended reservoirs formed from solutions of low density polyethylene plus extender in xylene by drying at ambient temperature (A), or at 75°C under a pressure of about 10mm of mercury (B). Table III shows the results obtained for other extended polymers and/or solvents. A mixture of low density polyethylene and polypropylene containing 50% by weight of polypropylene was cast from xylene and dried at ambient temperature. No extender was used. 100g of a 40:60 mixture of Freons 12 and 114 were held by 100g of the cast polymer mixture, and 30 g. of Butane 40 by the same weight of cast polymer mixture.

TABLE II

| Extender Type | % | Weight of propellant held per 100g of low density polyethylene | | | |
|---|---|---|---|---|---|
| | | Freons 12/114 (40:60) | | Butane 40 | |
| | | (A) | (B) | (A) | (B) |
| liquid paraffin | 0 | 31,36 | 71 | 48 | 33 |
| | 1 | 61 | 53 | 51 | 58 |
| | 5 | 172 | 103 | 58 | 48 |
| | 10 | 128 | 90 | 113 | 53 |
| | 20 | 69–130 | — | — | — |
| | 25 | 170 | 45 | 90 | 58 |
| | 50 | 70–104 | 56,57 | 78 | 19 |
| | 70 | 64 | — | — | — |
| paraffin wax congealing point 49°C | 50 | 55 | — | 25 | — |
| microcrystalline wax | 50 | 74 | — | 55 | — |
| diphenyl ether | 50 | 103 | — | 70 | — |
| diethyl phthalate | 50 | 47 | — | 44 | — |
| anhydrous lanolin | 50 | 70 | — | 68 | — |

TABLE III

| Polymer | Casting Solvent | Extender Type | % | Weight of propellant held per 100g of polymer | | | |
|---|---|---|---|---|---|---|---|
| | | | | Freons 12/114 (40:60) | | Butane 40 | |
| | | | | (A) | (B) | (A) | (B) |
| low density polythene | toluene | liquid paraffin | 50 | 52,95 | 28,24 | 38 | 12 |
| | benzene | " | 50 | 38 | <15 | 43 | <14 |
| high density polyethylene | xylene | " | 50 | 181,211 | 192 | 96 | 65 |
| polypropylene | xylene | liquid paraffin | 50 | 176–259 | 270,305 | 37,69 | 91,106 |
| | | paraffin wax congealing point 49°C | 50 | 265 | — | 60 | — |
| | | microcrystalline wax | 50 | 42 | — | 83 | — |
| | | diethyl phthalate | 50 | 194 | — | 73 | — |
| | | anhydrous lanolin | 50 | 60 | — | 96 | — |
| poly-4-methyl-pent-1-ene | xylene | liquid paraffin | 50 | 104 | — | 53 | — |
| trans-polyisoprene | xylene | " | 50 | 18,33 | — | 12 | — |

TABLE III-continued

| Polymer | Casting Solvent | Extender Type | % | Weight of propellant held per 100g of polymer | | | |
|---|---|---|---|---|---|---|---|
| | | | | Freons 12/114 (40:60) | | Butane 40 | |
| | | | | (A) | (B) | (A) | (B) |
| polyethylene oxide | xylene | " | 50 | 78 | — | 48 | — |

EXAMPLE 4

Four 6oz (170cc) tinplate internally lacquered aerosol cans (manufactured by Metal Box Co., London, England) were filled with a concentrate consisting of lauric acid 1%, palmitic acid 3%, triethanolamine 3%, sorbitol 5% and water to 100%, the amounts being as follows:

Can A, 160 ± 1g of concentrate and 17.0g of Freons 12/114 (40/60);

Can A', 160g of concentrate and 24.5g of Freons 12/114 (40/60);

Can B, 160g of concentrate and 25.0g of Freons 12/114 (40/60), with 6.8g of a reservoir of low density polyethylene and mineral oil (in a 1:1 ratio) cast from xylene and dried at room temperature, the reservoir being loose in the concentrate and;

Can B', 160g of concentrate and 24.5g of Freons 12/114 (40/60), with 10.0g of a reservoir of low density polyethylene cast from xylene and dried at room temperature, the reservoir being loose in the concentrate.

All the cans were fitted with 0.46mm orifice tinplate valves (manufactured by Metal Box Co.). The cans were left for 4 weeks, and the densities of the foams dispensed from the respective cans were then measured. The results are shown in FIG. 1 of the accompanying drawings. Similar tests were repeated three times and similar results were obtained.

EXAMPLE 5

Three tinplate cans (as used in Example 4) were filled as follows:

Can C, 160 ± 1g of concentrate (as in Example 4) and 7.1g of Butane 40 (22% propane, 24% iso-butane, 54% n-butane);

Can C', 160g of concentrate and 10.1g of Butane 40;

Can D, 160g of concentrate and 10.0g of Butane 40, with 2.7g of a reservoir of low density polyethylene and mineral oil in a 1:1 ratio cast from xylene and dried at room temperature, the reservoir being loose in the concentrate.

Figure 2:
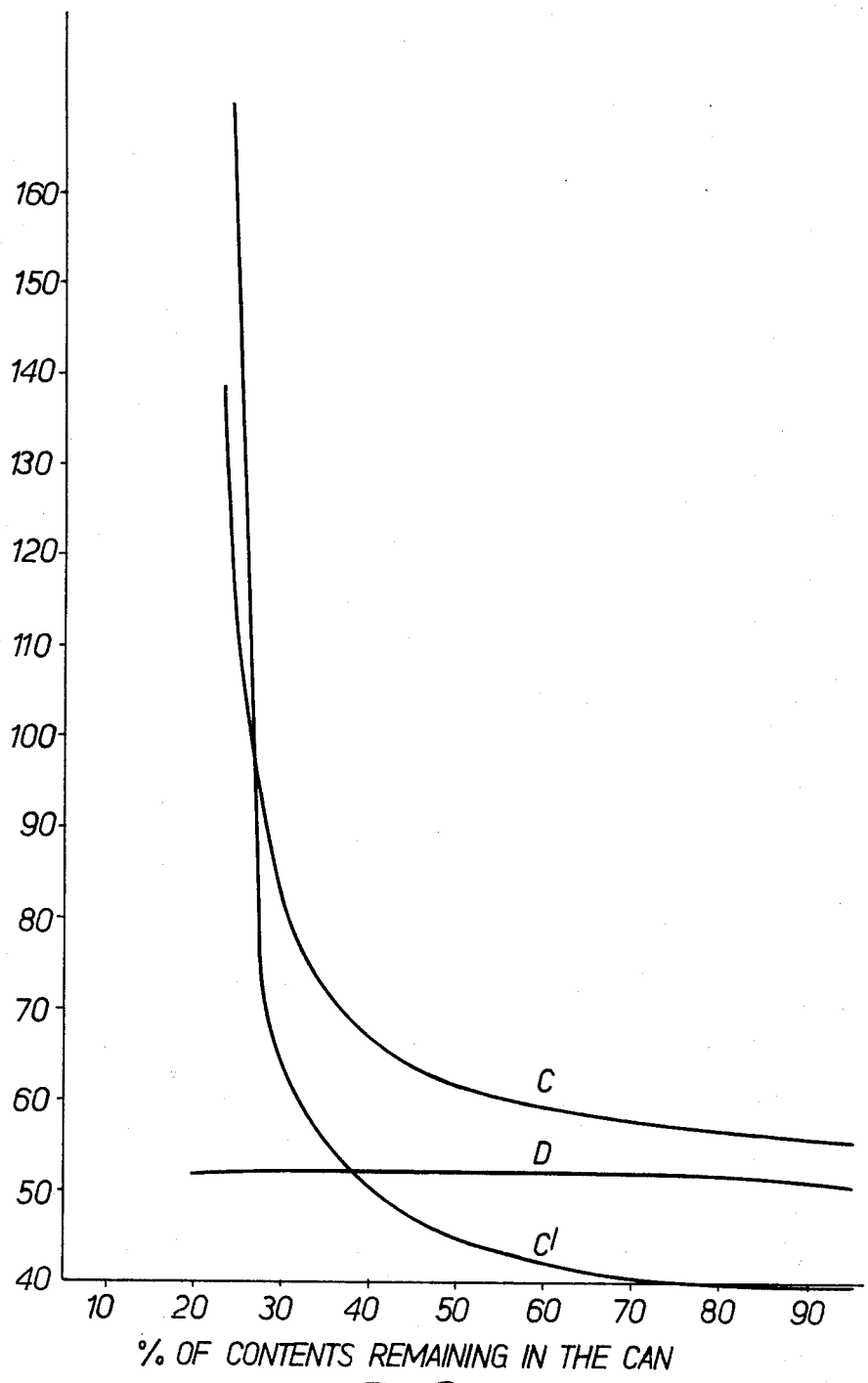
FIG. 2 shows curves C and C' for prior art cans and curve D for a can in accordance with the present invention.

The cans were treated as in Example 4. The results of the foam density measurements being shown in FIG. 2 of the accompanying drawings.

We claim:

1. A pressurized dispenser comprising a container provided with a valve-controlled outlet and containing a concentrate and a reservoir holding propellant, the reservoir comprising a crystalline organic polymer capable of holding propellant therein in such a way that the vapor pressure over the held propellant is reduced below that over the pure propellant, the polymer being capable of holding at least 15% of its own weight of propellant at room temperature, and the reservoir being capable of releasing propellant within the container as the contents of the container are dispensed.

2. A dispenser according to claim 1, wherein the polymer comprises a polyolefin, a polyamide, a polyester, polyformaldehyde, or a polyalkylene oxide.

3. A dispenser according to claim 1, wherein the polymer comprises low-density polyethylene, high-density polyethylene, polypropylene, poly-4-methylpent-1-ene, poly-but-1-ene, nylon 12, polyethylene terephthalate, or polyethylene oxide.

4. A dispenser according to claim 1, wherein the reservoir comprises an extended crystalline polymer, the extended polymer being capable of holding more propellant than the unextended polymer for a given weight of polymer, and the extended being non-leachable from the organic polymer by the concentrate or by the propellant.

5. A dispenser according to claim 4, wherein the extender is a hydrocarbon, a carboxylic acid, an ester, a ketone, an ether, an alcohol or a silicone oil.

6. A dispenser according to claim 4, wherein the extender comprises a liquid, saturated aliphatic hydrocarbon containing at least 20 carbon atoms.

7. A dispenser according to claim 4, wherein the extender is an oil or wax and the reservoir contains from 20 to 80% by weight of oil or wax.

8. A dispenser according to claim 4, wherein the reservoir contains about 50% by weight of oil or wax.

9. A pressurized dispenser comprising a container provided with a valve-controlled outlet and containing a concentrate and a reservoir holding propellant, the reservoir comprising a crystalline organic polymer which has been cast from an organic solvent, the cast polymer being capable of holding propellant therein in such a way that the vapor pressure over the held propellant is reduced below that over the pure propellant, the polymer being capable of holding at least 15% of its own weight of propellant at room temperature, and the reservoir being capable of releasing propellant within the container as the contents of the container are dispensed.

10. A dispenser according to claim 9, wherein the organic solvent comprises a hydrocarbon, a chlorinated hydrocarbon, or an alcohol.

11. A dispenser according to claim 9, wherein the organic solvent comprises benzene, toluene, xylene, decalin, tetralin, cyclohexane, iso-octane, carbon tetrachloride, trichloroethylene, or chlorotoluene.

12. A dispenser according to claim 9, wherein the organic solvent comprises benzene, toluene, xylene, decalin, tetralin, cyclohexane, iso-octane, carbon tetrachloride, trichloroethylene, or chlorotoluene.

13. A dispenser according to claim 9, wherein the polymer comprises a polyolefin, a polyamide, a polyester, polyformaldehyde, or a polyalkylene oxide.

14. A dispenser according to claim 9, wherein the polymer comprises low-density polyethylene, high-density polyethylene, polypropylene, poly-4-methylpent-1-ene, poly-but-1-ene, nylon 12, polyethylene terephthalate, or polyethylene oxide.

15. A dispenser according to claim 9, wherein the reservoir comprises an extended crystalline polymer, the extended polymer being capable of holding more propellant than the unextended polymer for a given weight of polymer, and the extender being non-leachable by the concentrate or by the propellant.

16. A dispenser according to claim 15, wherein the extender is a hydrocarbon, a carboxylic acid, an ester, a ketone, an ether, an alcohol or a silicone oil.

17. A dispenser according to claim 15, wherein the extender comprises a liquid, saturated aliphatic hydrocarbon containing at least 20 carbon atoms.

18. A dispenser according to claim 15, wherein the extender is an oil or wax and the reservoir contains from 20 to 80% by weight of oil or wax.

19. A dispenser according to claim 15, wherein the reservoir contains about 50% by weight of oil or wax.

20. A pressurized dispenser component in the form of a valve and dip tube assembly for a container, said component having at least a part thereof made of a solid crystalline organic polymeric substance capable of forming a non-fluid solution with at least 15% of its own weight of propellant at room temperature when placed in a dispenser container in contact with propellant, said substance thereby forming a propellant reservoir over which the vapor pressure of the dissolved propellant is less than that of the pure propellant, said reservoir being capable of releasing propellant in response to a reduction in gaseous pressure within the container.

21. A method of manufacture of a valve-controlled pressurized dispenser which comprises introducing into a dispenser container a reservoir consisting of a crystalline organic polymeric substance, said substance being capable of forming a solution with at least 15% of its own weight of propellant at room temperature, the vapor pressure of the dissolved propellant over the solution being less than that of pure propellant, and the reservoir being capable of releasing dissolved propellant to reduce the fall in pressure in the head space of the container which would otherwise occur as the contents of the container are dispensed.

22. A method according to claim 21 wherein the reservoir is charged with propellant before introduction into the container.

23. A pressurized dispenser comprising
a container having a valve-controlled outlet and containing a liquid concentrate and propellant mixture in a ratio to be dispensed, and
a reservoir positioned within the container and comprising a crystalline organic polymeric substance holding propellant in solution with the vapor pressure over the dissolved propellant being less than that of the pure propellant, said substance being capable of holding at least 15% of its own weight of propellant at room temperature, the reservoir being capable of releasing sufficient propellant to substantially maintain said liquid concentrate and propellant mixture ratio at least until a substantial portion of the concentrate has been dispensed.

24. A pressurized dispenser for foam comprising
a container having a valve-controlled outlet and containing a concentrate and propellant mixture to be dispensed as a foam, and
a reservoir positioned within the container and comprising a crystalline organic polymeric substance holding propellant in solution with the vapor pressure over the dissolved propellant being less than that of the pure propellant, said substance being capable of holding at least 15% of its own weight of propellant at room temperature, the reservoir being capable of releasing sufficient propellant to maintain the density of the foam dispensed substantially uniform over the period until at least a substantial portion of the concentrate has been dispensed.

25. A pressurized dispenser employing a gaseous propellant to provide a predetermined driving pressure to dispense a concentrate which comprises
a container having a valve-controlled outlet and containing a concentrate and gaseous propellant, and
a reservoir positioned within the container and comprising a crystalline organic polymeric substance holding propellant in solution with the vapor pressure over the dissolved propellant being less than that of the pure propellant, said substance being capable of holding at least 15% of its own weight of propellant at room temperature, the reservoir being capable of releasing propellant to provide a supplemental source to substantially maintain the predetermined driving pressure.

26. A pressurized dispenser employing a gaseous propellant to provide a driving pressure to dispense a powder concentrate which comprises
a container having a valve-controlled outlet and containing a powder concentrate to be dispensed, and
a reservoir positioned within the container and comprising a crystalline organic polymeric substance holding propellant in solution with the vapor pressure over the dissolved propellant being less than that of the pure propellant, said substance being capable of holding at least 15% of its own weight of propellant at room temperature, the reservoir being capable of releasing more gaseous propellant than is present in a volume of the pressurized gaseous propellant equivalent to the volume occupied by the reservoir.

27. A method for assembling a pressurized dispenser for expelling a concentrate product, the dispenser including a container having a valve-controlled outlet and containing the concentrate product and a predetermined amount of a propellant, which comprises inserting into the container a reservoir comprising a crystalline organic polymeric substance capable of holding propellant in solution with the vapor pressure over the dissolved propellant being less than that of the pure propellant, the reservoir being further capable of forming a solution with at least 15% of its own weight of propellant at room temperature, charging the container with the concentrate and propellant, the amount of the propellant being in excess of the predetermined amount, and allowing the reservoir to form a solution of at least a substantial portion of the excess propellant.

28. A pressurized dispenser for dispensing only a gaseous propellant comprising
a container having a valve-controlled outlet and
a reservoir positioned within the container and comprising a crystalline organic polymeric substance holding propellant in solution with the vapor pressure over the dissolved propellant being less than that of the pure propellant, said substance being capable of holding at least 15% of its own weight of propellant at room temperature, the reservoir being capable of releasing more gaseous propellant than is present in a volume of the pressurized gaseous propellant equivalent to the volume occupied by the reservoir.

* * * * *